United States Patent
Vertanen

[19]

[11] Patent Number: 6,155,048
[45] Date of Patent: Dec. 5, 2000

[54] ACTUATOR FOR A TURBOCHARGER

[75] Inventor: Mark W. Vertanen, Creston, Iowa

[73] Assignee: GITS Manufacturing Company, Creston, Iowa

[21] Appl. No.: 08/939,244

[22] Filed: Sep. 29, 1997

[51] Int. Cl.[7] ........................... F02B 37/18; F16K 31/365
[52] U.S. Cl. ............................................ 60/602; 251/61.4
[58] Field of Search ............................ 60/600, 601, 602, 60/603; 251/61.4, 61.2

[56] References Cited

U.S. PATENT DOCUMENTS

| | | | |
|---|---|---|---|
| 2,715,009 | 8/1955 | Beekley | 251/61.4 |
| 3,048,274 | 8/1962 | Lundeen | 251/61.4 |
| 3,195,854 | 7/1965 | Pflieger | 251/61.4 |
| 4,403,538 | 9/1983 | Rise | 60/602 |
| 4,655,043 | 4/1987 | McInerney | 60/602 |

FOREIGN PATENT DOCUMENTS 2033007  5/1980  United Kingdom ..................... 60/602

*Primary Examiner*—Michael Koczo
*Attorney, Agent, or Firm*—Zarley, McKee, Thomte, Voorhees & Sease

[57] ABSTRACT

An actuator for a turbocharger includes a hollow body member having a open top. A flexible elastic diaphragm extends across and is sealingly secured to the open top of the hollow body member which sealingly secures it thereagainst. A cap covers the open top and has a recessed surface formed therein directed toward the open top. The cap is sealingly secured against the body member so as to define a pressurizable cavity in the hollow between the cap and the diaphragm, and the cap having a rigid stem protruding therefrom with a fluid passage extending through the stem and into fluid communication with the cavity. An actuator rod is axially movable by the diaphragm in response to a predetermined pressure in the cavity.

4 Claims, 3 Drawing Sheets

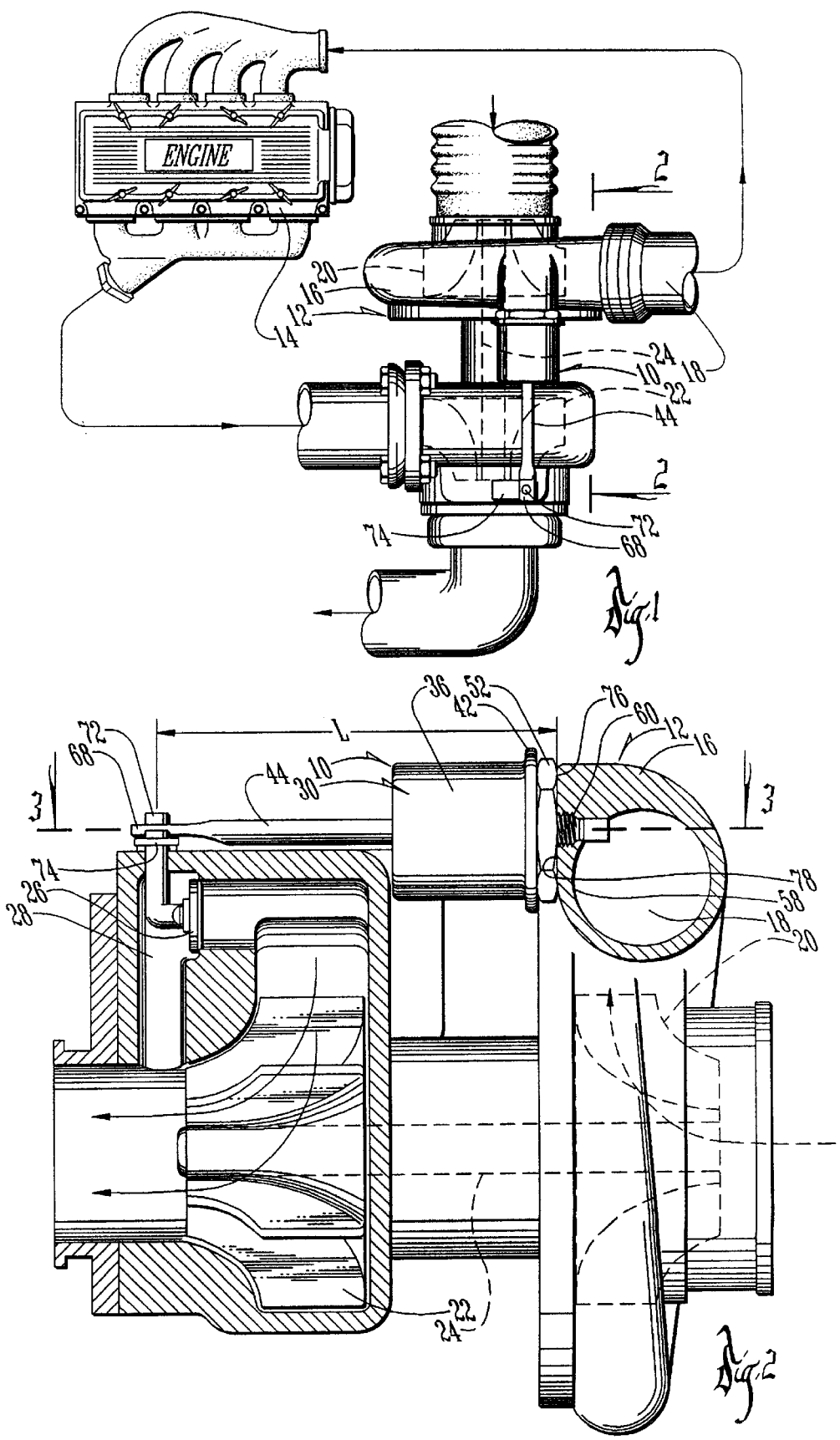

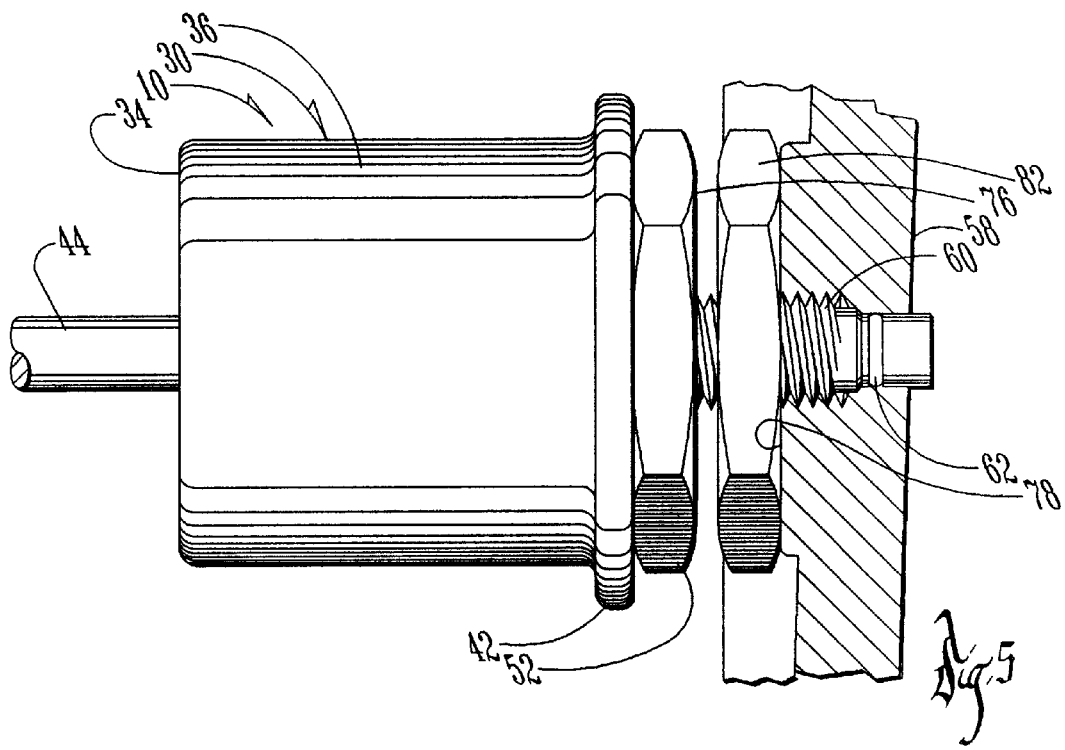
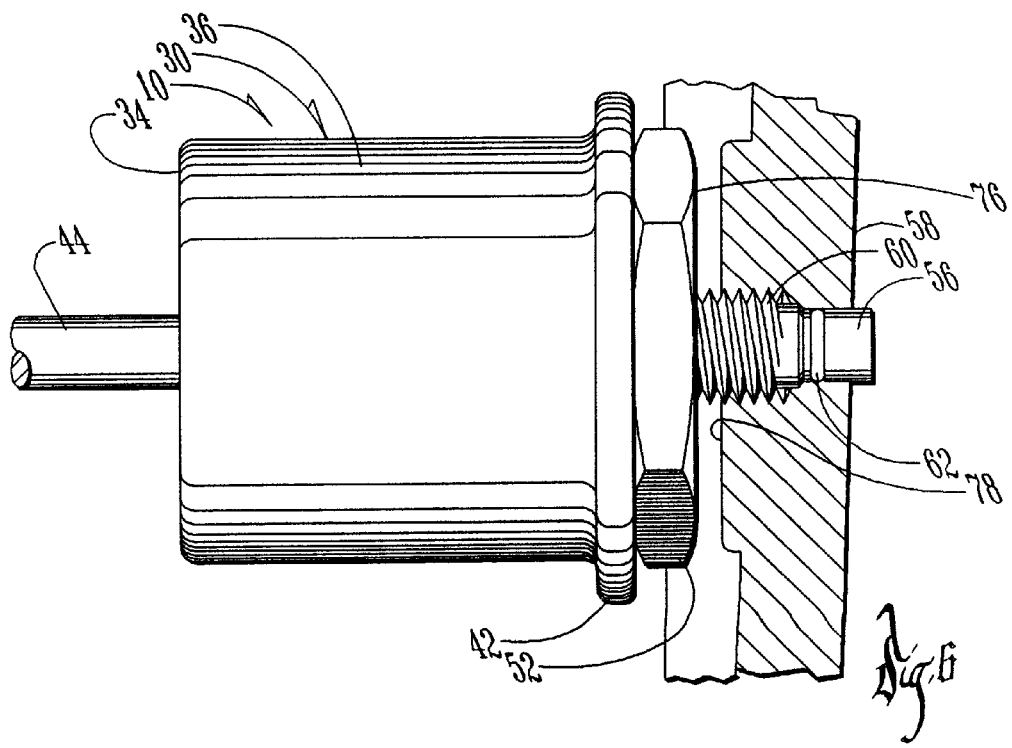

ACTUATOR FOR A TURBOCHARGER

BACKGROUND OF THE INVENTION

The present invention relates to the field of engines having turbochargers. More particularly, the invention relates to an actuator for the waste gate valve of a turbocharger. This actuator mounts directly on the pressurized outlet of the turbocharger so that it can sense a pressure signal from inside the turbocharger outlet without relying on external hoses.

Waste gate valve actuators are generally known in the automotive engine art. Conventional actuators have a cap with a hollow stem protruding therefrom. One end of a flexible hose is connected to the stem and the other end is routed to a pressure input source, typically somewhere near the pressurized outlet of the turbocharger. The flexible hose is subjected to extreme temperatures and humidity, vibration, chemical corrosion, and a variety of other harsh environmental factors present in a turbocharged engine. Stainless steel braided hoses and the like are designed to be resistant to these factors, but are expensive considering they still have a limited life. The hose assembly costs more than the actuator in some cases. Furthermore, the connections at either end of the hose may sometimes leak and thereby decrease the performance of the turbocharged engine.

A separate bracket is typically provided to mount the actuator close to both the waste gate and the pressurized outlet of the turbocharger. As an additional component, the bracket increases the cost of manufacturing and assembling the actuator. The manufacturer must set the position of the bracket and the pre-formed hole in the actuator rod (for connecting the actuator to the waste gate valve) on a test stand at a given set pressure before shipping the actuator to the engine or turbocharger manufacturer. The set pressure corresponds to an idling condition of the engine. Sometimes the actual conditions encountered upon installation do not match the theoretical or presumed conditions used to establish the setting. Thus, undesirable variances in expected performance can result.

Tampering has been a troublesome and recurrent issue for conventional actuators with brackets and hoses. Some users have installed a clamp or an orifice in the hose to restrict the flow. This increases the boost pressure of the turbocharger. Others have installed spacers or shims around the bracket, pre-loading the actuator spring to alter the boost pressure. If the boost pressure is increased too much, the engine can be damaged.

Therefore, a primary objective of the present invention is the provision of an improved actuator for the waste gate valve of a turbocharger.

Another objective of the present invention is the provision of a hoseless actuator.

Another objective of the present invention is the provision of an actuator with integral means for mounting and fluidly connecting the actuator to the pressurized outlet of the turbocharger and locating the rod with respect to the waste gate, thereby eliminating the need for a separate mounting bracket.

Another objective of the present invention is the provision of an actuator which directly and accurately senses the pressure within the pressurized outlet of the turbocharger.

Another objective of the present invention is the provision of an actuator which reduces the opportunities for tampering.

Another objective of the present invention is the provision of an actuator which reduces the number of components of the installed actuator.

Another objective of the present invention is the provision of an actuator with an actuator rod that has a punch-set hole therein for accurately connecting the actuator to the waste gate valve.

Another objective of the present invention is the provision of means for making fine tuning adjustments in the effective length of the actuator rod and thereby fine tuning the boost pressure of the turbocharger.

Another objective of the present invention is the provision of an actuator which simplifies the assembly and test process.

Another objective of the present invention is the provision of an actuator which is economical to produce, durable, and reliable in use.

These and other objectives will be apparent from the drawings in view of the description and the claims which follow.

SUMMARY OF THE INVENTION

The present invention relates to an actuator for a turbocharger. The actuator includes a hollow body member having an open top; a flexible elastic diaphragm extending across the open top of the hollow body member and sealingly secured thereagainst; a cap covering the open top and having a recessed inner surface formed therein directed toward the open top, the cap being sealingly secured against the body member so as to define a pressurizable cavity between the inner surface of the cap and the diaphragm, the cap having a rigid stem protruding therefrom with a fluid passage extending therethrough and into fluid communication with the cavity; and an actuator rod axially movable by the diaphragm in response to a predetermined pressure in the cavity.

As a result, a unique method of presetting and installing actuators is possible.

In one embodiment, the stem threads into the turbocharger wall until the cap abuts the wall. Such positive location allows a hole to be punched in the rod precisely at a desired length away from the wall while a given pressure is applied to the cavity. In another embodiment, the stem can be threaded into a wall of the turbocharger and a lock nut can be provided thereon to make the actuator and its rod lockable and adjustable with the turbocharger.

BRIEF DESCRIPTION OF THE DRAWINGS

FIG. 1 is a schematic representation of a turbocharged engine equipped with the actuator of the present invention.

FIG. 2 is sectional view of the turbocharger taken along line 2—2 in FIG. 1 and shows the mounting of the actuator of this invention to the turbocharger.

FIG. 5 is a front elevation view of an alternative embodiment of the present invention wherein a locknut is utilized on the stem to provide boost pressure adjustments. The turbocharger wall is shown in cross section so as to expose the stem of the actuator.

FIG. 6 is a front elevation view of an alternative embodiment of the present invention, which is similar to the embodiment shown in FIG. 5 except the locknut has been omitted.

DETAILED DESCRIPTION OF THE PREFERRED EMBODIMENT

Figures 3, 4:
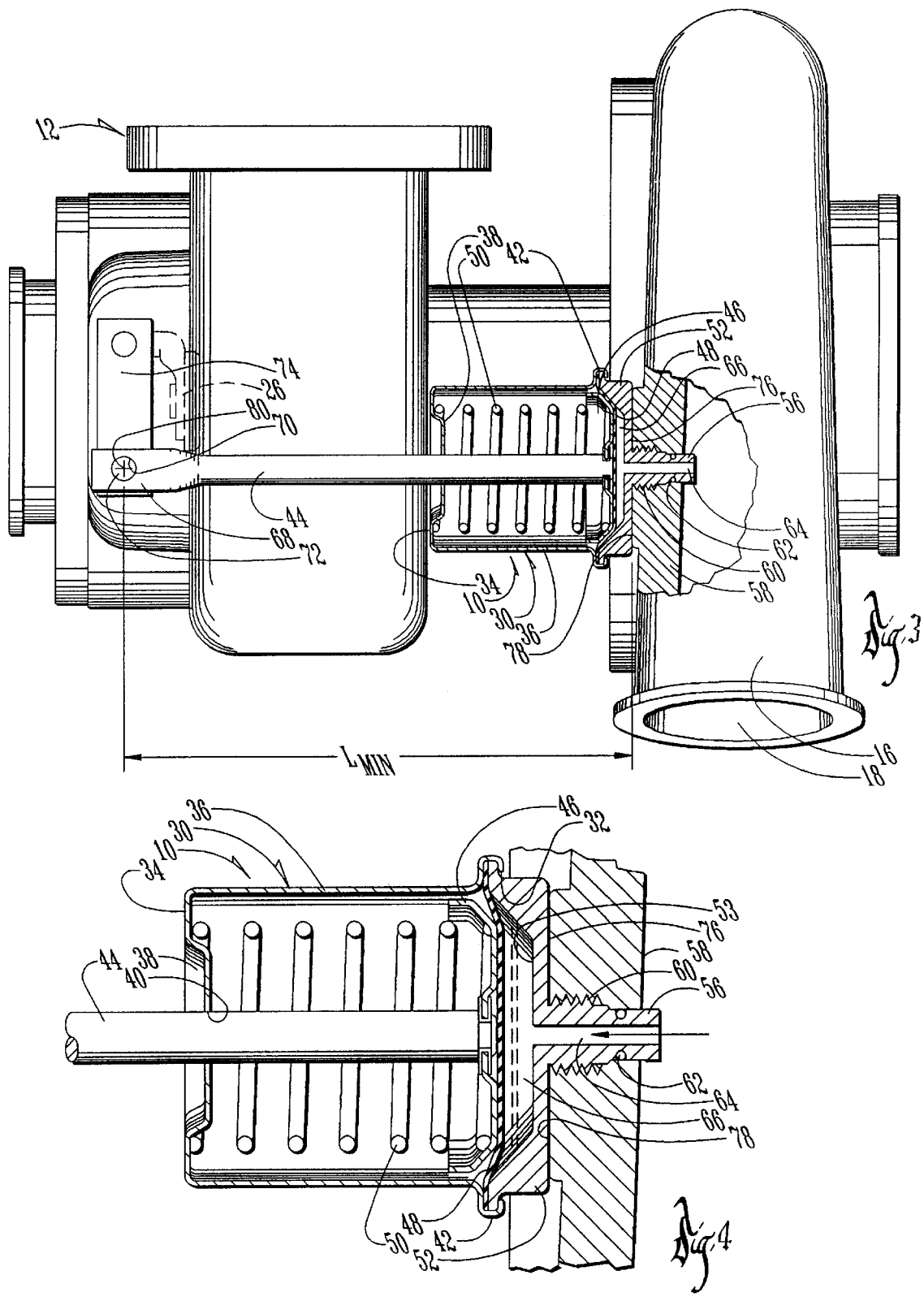
FIG. 3 is a sectional view of the turbocharger and actuator taken along line 3—3 in FIG. 2.
FIG. 4 is an enlarged sectional view of the actuator of FIG. 3, showing how the diaphragm moves the actuator rod in response to turbocharger compressor outlet pressure.

The present invention will be described as it applies to its preferred embodiment. It is not intended that the present invention be limited to the described embodiment. It is intended that the invention cover all alternatives, modifications, and equivalencies which may be included within the spirit and scope of the invention.

In the drawings, the actuator of the present invention is generally denoted by the reference numeral 10. As shown in FIG. 1, the actuator 10 is mounted on a turbocharger 12 which is operatively associated with an engine 14. The turbocharger operates in a known and conventional manner to supply a boost pressure to the engine 14.

As best seen in FIG. 2, the turbocharger 12 includes a compressor housing 16 which has an opening 18 for delivering pressurized fluid to the engine 14. The turbocharger 12 includes a pressure turbine 20 and an exhaust turbine 22 interconnected by shaft 24 in a conventional manner. As shown in FIGS. 2 and 3, a pivotally operated waste gate valve 26 controls the flow of fluid from the exhaust manifold of the engine through the exhaust turbine 22. As is well known in the automotive art, this controls the boost pressure supplied by the turbocharger 12 to the engine 14. When the waste gate valve 26 is opened by the actuator 10, fluid from the engine exhaust manifold can bypass the exhaust turbine 22 through the passage 28, thereby reducing the boost pressure. The operation of the turbocharger 12 and the waste gate valve 26 are conventional and are not the subject of the present invention.

The present invention provides a novel actuator 10 for mounting on the turbocharger 12, sensing the pressure at the pressurized outlet near the opening 18, and controlling the waste gate valve 26. The actuator 10 includes a hollow, cup-shaped body member 30 having an open top 32, a bottom 34 and a continuous side wall 36. The bottom 34 has a raised central portion 38 and a centrally located hole 40 therethrough. The open top 32 is defined by a J-shaped rim 42 protruding outwardly from the body member 30.

The actuator 10 has a spring-biased plunger mechanism which includes an actuator rod 44 with an upper end slidably extending into the body member 30 through the hole 40. An annular, generally convex plunger 46 is secured for axial movement with the actuator rod 44 on the enclosed end thereof. The rod 44 is rotatable with respect to the plunger 46. The actuator rod 44 and the plunger 46 attached thereto are yieldably urged or biased into a flexible elastic diaphragm 48 by a spring 50.

The spring 50 is of the coil compression type. The spring 50 has an inside diameter adapted to receive the central raised portion 38 of the body member 30 for radial guidance. The outside diameter of the spring 50 is small enough to fit within the concave lower side of the plunger 46.

As best seen in FIG. 4, a cup-shaped cap 52 covers the open top 32 and is secured to the body member 30, preferably as discussed below. The cap 52 has a flange 54 protruding outwardly from its lower end. The flange 54 fits within the J-shaped rim 42 of the body member 30. The diaphragm 48 extends across the open top 32 of the body member 30 and is clamped between the cap 52 and the body member 30 by a conventional clamping technique, such as by crimping the rim 42 onto the flange 54 of the cap 52 with the diaphragm therebetween.

The cap 52 includes a flat, planar upper surface 76 and a stem 56 protruding therefrom and extending into a wall 58 of the compressor housing 16. The stem 56 has securing means, such as threads 60 thereon, which adjustably secure the actuator 10 to the compressor housing 16. An 0-ring 62 mounts on the outside of the stem 56 so as to provide a seal around the stem 56. A fluid passage 64 extends through the stem.

The cap 52 has a recessed lower or interior surface 53. The passage 64 fluidly connects the interior of the compressor housing 16 to a pressurizable cavity 66 disposed between the diaphragm 48 and the inner surface 53 of the cap 52. As seen in FIGS. 3 and 4, the pressurizable cavity 66 expands or contracts as the pressure from the compressor housing 16 moves the diaphragm 48. When the pressure in the compressor housing 16 increases, this is communicated to the cavity 66 through the passage 64 in the stem 56. The increased pressure causes the elastically flexible diaphragm 48 to move downwardly (FIG. 4). The pressure in the cavity 66 causes the spring 50 to be depressed by the plunger 46. Thus, the actuator rod 44 attached to the plunger 46 moves downwardly in response to increased pressure in the compressor housing 16 and upwardly in response to decreased pressure therein.

As best seen in FIG. 3, the actuator rod 44 has a flattened lower end portion 68 which has a hole 70 punched or otherwise formed therethrough. The hole 70 receives a pin 72 which connects the actuator rod 44 to a lever arm 74 operatively connected to the waste gate valve 26.

The present invention provides a unique method of mounting the actuator 10 to the compressor housing 16. A substantially flat, planar mounting surface 76 extends along the top of the cap 52 perpendicular to the threads 60. The mounting surface 76 of the cap 52 abuts a mating flat, planar mounting surface 78 formed on the compressor housing 16. The mounting surface 78 preferably extends parallel to the waste gate valve 26. When the stem 56 is inserted as far as possible into the wall 58 of the compressor housing 16, the mounting surface 76 abuts the mounting surface 78. Thus, the upper portion of the actuator 10 is securely and positively located with respect to the compressor housing 16.

The actuator 10 of the present invention provides an effective actuator rod length L (FIG. 2) defined by the distance between the mounting surface 78 and the center 80 of the hole 70. The minimum effective length $L_{MIN}$ of the actuator rod 44 occurs when the cavity 66 is at its smallest, as shown in FIG. 3. In the flush mounted embodiment shown in FIGS. 2–4, pressure from the compressor housing 16 enters the cavity 66 through the passage 64 in the stem 56 and urges the diaphragm 48, the plunger member 46, and the rod 44 in the direction shown. The valve 10 operates automatically in that it opens the waste gate valve 26 whenever the outlet pressure of the turbocharger compressor reaches a predetermined value exceeding the spring bias. Flush mounting of the actuator 10 to the mounting surface 78 yields greater accuracy in setting the actuator to respond at the predetermined pressure value.

FIG. 5 illustrates another embodiment of the invention wherein a lock nut 82 is interposed between the housing 16 and the cap 52 at the stem 56. The cap member 52 on the actuator 10 can be rotated in whatever direction and increment needed to yield the desired effective actuator rod length L. Then the lock nut 82 is tightened against the mounting surface 78 to fix the length L at a particular given boost pressure.

It is contemplated that the locknut could be eliminated if the threads 60 were suitably tight. The actuator 10 will not be displaced by engine vibrations, etc. so long as it remains rigidly (but adjustably) fixed to the compressor housing 16. This embodiment is shown in FIG. 6.

Because conventional actuators have their plungers fixed on their actuator rods, the actuator can only be turned in 180 degree increments to adjust boost pressure. The problem is that the body member cannot be turned without turning the actuator rod. Therefore, the hole in the flattened end of the rod only aligns itself with the waste gate valve pin every 180 degrees. In contrast, the rod 44 and body member 30 of this invention rotate independently and therefore provide great fine tuning flexibility.

The fabrication, assembly, test and installation of the actuator 10 are simple and easy. The manufacturer of the actuator 10 supplies the necessary components for an actuator assembly. The plunger 46 is rotatably attached to the upper end of the rod 44. The flattened portion 68 of the lower end of the rod 44 is initially blank because the hole 70 has not yet been formed therethrough. The spring 50 is inserted into the body member 30 through the open end 32. The rod assembly, including the rod 44 and the plunger 46, is also inserted into the body member 30 through the open end 32 so that the lower end of the rod 44 extends through the hole 40. Then the diaphragm 48 and the cap 52 are crimped on the body member 30 at the rim 42. The O-ring 62 is installed on the stem 56.

The actuator assembly can now be placed on a test stand (not shown) having a mounting like the mounting surface 78 of the turbocharger 12 to which the actuator will eventually be mounted. A predetermined pressure is applied to passage 64 of the stem 56 and communicated to the cavity 66. This pressure causes the cavity 66 to expand and the diaphragm 48 and the actuator rod 44 are urged downwardly against the bias of th e spring 50. Once the pressure in the cavity 66 has equalized with the predetermined pressure applied by the test stand, the movement of the actuator rod 44 will cease. The hole 70 is then punched in the flattened end 68 of the rod 44, or at least marked for later punching or machining Thus, the effective length L of the actuator rod 44 can be precisely established at a predetermined pressure. Usually the predetermined pressure corresponds to a known condition of the engine and its turbocharger, such as when the engine 14 is idling. Of course, the presetting operation described above could also be done by the turbocharger or engine manufacturer. This would remove any possible variance between the mounting pad of the test stand and the mounting surface 78 on the actual turbocharger 12.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A hoseless actuator for a turbocharger comprising:

a hollow body member having an open end;

an elastic diaphragm extending across the open end of the body member;

a spring disposed in the body member and operatively positioned between the diaphragm and the body member;

a cap covering the open end so as to define a pressurizable cavity between the cap and the diaphragm opposite the spring, the cap including an externally threaded stem integrally formed thereon; and an actuator rod axially movable by the diaphragm against the spring in response to pressure changes in the cavity.

2. The actuator of claim 1 comprising a lock nut adjustably attached to the threads on the stem.

3. The hoseless actuator of claim 1 wherein the stem is hollow and has a passageway extending therethrough and into fluid communication with the pressurizable cavity.

4. In combination with a turbocharger, an actuator comprising:

a hollow body member having an open end;

an elastic diaphragm extending across the open end of the body member;

a spring disposed in the body member and operatively positioned between the elastic diaphragm and the body member;

a cap covering the open end of the body member and being mountable to the turbocharger;

the cap defining a pressurizable cavity between the cap and the diaphragm opposite the spring, the cap having an integral externally threaded hollow stem formed thereon for rigidly attaching the cap to the turbocharger and allowing fluid communication between the turbocharger and the pressurizable cavity; and an actuator rod axially movable by the diaphragm against the spring in response to pressure changes in the cavity.

* * * * *